(12) United States Patent
Ranade et al.

(10) Patent No.: US 9,422,952 B2
(45) Date of Patent: Aug. 23, 2016

(54) VORTEX DIODES AS EFFLUENT TREATMENT DEVICES

(71) Applicant: Council of Scientific & Industrial Research, New Delhi (IN)

(72) Inventors: Vivek Vinayak Ranade, Maharashtra (IN); Amol Arvind Kulkarni, Maharashtra (IN); Vinay Manoharrao Bhandari, Maharashtra (IN)

(73) Assignee: COUNCIL OF SCIENTIFIC & INDUSTRIAL RESEARCH, New Delhi (IN)

(*) Notice: Subject to any disclaimer, the term of this patent is extended or adjusted under 35 U.S.C. 154(b) by 111 days.

(21) Appl. No.: 14/351,124
(22) PCT Filed: Oct. 11, 2012
(86) PCT No.: PCT/IN2012/000676
§ 371 (c)(1),
(2) Date: Apr. 10, 2014
(87) PCT Pub. No.: WO2013/054362
PCT Pub. Date: Apr. 18, 2013

(65) Prior Publication Data
US 2014/0251904 A1    Sep. 11, 2014

(30) Foreign Application Priority Data
Oct. 11, 2011   (IN) .......................... 2918/DEL/2011
Feb. 14, 2012   (IN) ............................ 412/DEL/2012

(51) Int. Cl.
*C02F 1/72* (2006.01)
*F15D 1/00* (2006.01)
*C02F 1/34* (2006.01)
*C02F 3/28* (2006.01)
(Continued)

(52) U.S. Cl.
CPC ... *F15D 1/00* (2013.01); *C02F 1/34* (2013.01); *C02F 1/5281* (2013.01); *C02F 1/72* (2013.01); *C02F 3/28* (2013.01); *C02F 9/00* (2013.01); *F15C 1/16* (2013.01); *F15D 1/0015* (2013.01); *C02F 1/722* (2013.01); *C02F 1/78* (2013.01); *C02F 3/02* (2013.01); *C02F 2101/308* (2013.01); *C02F 2103/28* (2013.01);
(Continued)

(58) Field of Classification Search
CPC ............. B63J 1/00; B63J 4/002; C02F 1/006; C02F 1/36; C02F 2301/026; C02F 2103/008; C02F 2301/024
See application file for complete search history.

(56) References Cited

U.S. PATENT DOCUMENTS 4,259,988 A   4/1981 Singh
5,042,998 A   8/1991 Beusen
(Continued)

FOREIGN PATENT DOCUMENTS

GB   2 108 714 A   5/1983
GB   2 391 959 A   2/2004
(Continued)

*Primary Examiner* — Walter D Griffin
*Assistant Examiner* — Cameron J Allen
(74) *Attorney, Agent, or Firm* — Knobbe, Martens, Olson & Bear, LLP

(57) ABSTRACT

The present invention discloses device that can generate a strong vortex in the vortex chamber which significantly enhances rate of reactions and effectiveness of waste water treatment. The present invention disclose vortex diodes with or without inserts/stabilizers as continuous flow reactors to induce cavitation to generate radicals which reduces Chemical Oxygen Demand (COD), ammoniacal nitrogen and color of waste water effectively in effluent treatments.

9 Claims, 7 Drawing Sheets

(51) Int. Cl.
 C02F 9/00 (2006.01)
 F15C 1/16 (2006.01)
 C02F 1/52 (2006.01)
 *C02F 1/78* (2006.01)
 *C02F 3/02* (2006.01)
 *C02F 101/30* (2006.01)
 *C02F 103/28* (2006.01)
 *C02F 103/30* (2006.01)
 *C02F 103/32* (2006.01)

(52) U.S. Cl.
 CPC ........ *C02F 2103/30* (2013.01); *C02F 2103/32* (2013.01); *C02F 2305/023* (2013.01); *C02F 2305/026* (2013.01); *Y02W 10/15* (2015.05)

(56) References Cited

U.S. PATENT DOCUMENTS 5,573,029 A 11/1996 Freimann
6,402,820 B1 6/2002 Tippetts et al.

FOREIGN PATENT DOCUMENTS

| SU | 470 664 A1 | 5/1975 |
| WO | WO 2007/108012 A2 | 9/2007 |

VORTEX DIODES AS EFFLUENT TREATMENT DEVICES

TECHNICAL FIELD OF INVENTION

The present invention relates to a device that can generate a strong vortex in the vortex chamber which significantly enhances rate of reactions and effectiveness of waste water treatment. Particularly, the present invention relates to vortex diodes optionally with inserts as continuous flow reactors to induce cavitation to generate radicals for effluent treatment.

BACKGROUND AND PRIOR ART

Vortex diodes are among the useful fluidic devices, which do not have any moving components. The basic design of a vortex diode consists of a disc-shaped chamber with cylindrical axial and tangential ports, but the devices have been modified over the years by many researchers and designers to improve their function as well as to use them for purposes other than as valves.

Effluents from various industries such as chemical, paper and pulp, tannery and such like have the issue of high Chemical Oxygen Demand (COD), while the limit set by Pollution Control Board usually does not exceed 250 mg/l for industrial wastewaters. Chemical Oxygen Demand commonly represents the amount of organic compounds/pollutants in water and is an important parameter in water analysis, especially for wastewater treatment for the protection of environment. Several chemical methods are known in the art for treating effluent to control COD based on ozone, hydrogen peroxide, steam, oxygen, charge neutralizing species/coagulants and others. A few physical methods also exist for the treatment of waste waters viz. filtration, electrooxidation, electro-coagulation, froth floatation, adsorption, etc. There are certain organic pollutants, especially in dyes/pigments/colorants/textile wastewaters, which are considered refractory compounds difficult to remove/degrade by using conventional methods of chemical/biological treatment. For such pollutants, newer techniques have to be explored where extreme conditions can break down pollutants and organic molecules.

There are number of industries such as textile and dyeing industries that use many kinds of dyes, both reactive and non-reactive, and discharge large amounts of highly coloured wastewater. This effluent must be treated prior to discharge in order to comply with the environmental protection laws for the receiving waters. The biological treatment processes that are frequently used to treat textile effluents are generally efficient for meeting limits of Biological Oxygen Demand (BOD) and Total Suspended Solids (TSS) removal but are largely ineffective for removing colour from the wastewaters. Consequently effluents many times contain appreciable amounts of colour. This water though can pass as suitable for discharge fails the criteria for recycle and reuse. Other methods of physico-chemical treatment operations, including adsorption, oxidation, chemical precipitation etc. are also reported in literature with little success.

Most of the existing wastewater treatment methodologies differ significantly from each other not just in their principles, but in the form of application, process economics with huge differences in land, equipment and material requirements. Further, since effluent treatment is more complicated due to varied types of pollutants including organic and inorganic pollutants, new strategy is required involving novel materials, methods and process integration options/technology for wastewater treatment.

Cavitation technology in recent years is found to be substantially beneficial in waste water treatment. Cavitation is a phenomenon of formation, growth and collapse of micro bubbles within a liquid. Cavitation occurs due to increase in kinetic energy of the fluid at the expense of local pressure when the fluid passes through constriction. Hydrodynamic cavitation known in the art utilizes constriction such as orifice/venturi in the path of flow of fluid. Moreover, cavitation is realized due to linear velocity of liquid in conventional devices. Vortex diode disclosed in this invention on the other hand uses rotational flow to generate cavitation. The nature of cavities (number density of generated cavities and intensity of collapse of generated cavities) in such rotational flows realized in vortex diode is significantly different than the other hydrodynamic cavitation devices known in the art as orifice/ventury which are based on constriction of the flow.

U.S. Pat. No. 4,112,977 discloses a vortex diode wherein the tangential ports can be formed as push-fit into the main body of the diode. It is recommended to have as many tangential ports as possible to improve flow symmetry and reduce pressure losses.

U.S. Pat. No. 6,358,415 titled "Vortex sewage disposal apparatus" relates to a vortex sewage disposal apparatus for the disposal of construction sewage.

The vortex diode as an apparatus which uses cavitation and collapse of cavities generated due to rotational flows has been hitherto unexplored for the treatment of effluents. Particularly, the effluents generated from highly polluting industries such as dye, pigments and other colour effluent generating industries that also generate effluent with high COD, ammoniacal nitrogen or color have not been subjected to cavitation treatment by a vortex diode.

OBJECTS OF INVENTION

The main objective of the present invention is to provide a device that can generate a strong vortex in the vortex chamber which significantly enhances rate of reactions and effectiveness of waste water treatment.

Another objective of the present invention is to provide use of a vortex diode that uses the cavitation generated by rotational flows for the treatment of effluent.

Another objective of the present invention is to provide a system and method of controlling COD (chemical oxygen demand), ammoniacal nitrogen and color reduction in effluent treatment using the improved vortex diode.

SUMMARY OF THE INVENTION

Accordingly, the present invention provides a cavitational vortex diode for effluent treatment optionally with insert/vortex stabilizers. The inserts disclosed in this invention induce strong vortex in the vortex chamber, stabilize the vortical flow in the vortex diode and manipulate nature of cavitation (number density of generated cavities and intensity of cavity collapse) for effective effluent treatment.

The vortex diode of the present invention operates with the tangential port as the inlet thereby setting up a high resistance mode of operation and an axial port to discharge treated effluent water.

In another aspect, the invention provides as apparatus for reducing COD, ammoniacal nitrogen and color of effluent water.

In another aspect, the invention provides an apparatus and a method of treating effluents using vortex diode optionally with inserts/vortex stabilizers.

In another aspect of the present invention, the velocity of water and the pressure drop varies with the size and shape of the insert/vortex stabilizer.

In yet another aspect, the vortex diode with inserts/vortex stabilizer helps in reducing chemical oxygen demand (COD), ammoniacal nitrogen and color of the effluents effectively.

In one more aspect of the invention, the reduction of COD by the vortex diode decreases BOD that increases the anaerobic gas yield from the effluent water.

In an embodiment of the invention, a cavitational vortex diode for effluent treatment, wherein said vortex diode comprises;
  i. a single or multiple inlet as tangential port (104) attached to vortex diode cavitation chamber (101), wherein the flow entering from the tangential port sets up a high resistance mode of operation;
  ii. optionally vortex stabilizer/insert (103) connected to a point on the axis of the chamber, 101 (vertex), wherein said vortex stabilizer/insert connection between the point and the perimeter of the base is made of a surface achieved out of straight connecting lines having slope or curved lines having specific radius of curvature with the vertex as a common point; and
  iii. an axial port (102) to discharge treated effluent water;

In one embodiment of the invention, the insert/vortex stabilizer is placed in the chamber from the surface opposite to the axial port.

In another embodiment of the invention, An apparatus consisting of vortex diode with insert/vortex stabilizer for treating effluents, comprising;
  i. a single or multiple inlet as tangential port (104) attached to vortex diode cavitation chamber (101), wherein the flow entering from the tangential port sets up a high resistance mode of operation;
  ii. optional vortex stabilizer/insert (103) connected to a point on the axis of the chamber, 101 (vertex), wherein said vortex stabilizer/insert connection between the point and the perimeter of the base is made of a surface achieved out of straight connecting lines having slope or curved lines having specific radius of curvature with the vertex as a common point; and
  iii. an axial port (102) to discharge treated effluent water In yet another embodiment, the insert/vortex stabilizer is placed in the chamber from the surface opposite to the axial port.

In yet another embodiment, a method of treating effluent wherein said treatment comprises
  i. a vortex diode comprising a single or multiple inlet as tangential port (104) attached to vortex diode cavitation chamber (101), wherein the flow entering from the tangential port sets up a high resistance mode of operation;
  ii. optionally vortex stabilizer/insert (103) connected to a point on the axis of the chamber, 101 (vertex), wherein said vortex stabilizer/insert connection between the point and the perimeter of the base is made of a surface achieved out of straight connecting lines having slope or curved lines having specific radius of curvature with the vertex as a common point; and
  iii. an axial port (102) to discharge treated effluent water In still another embodiment, said diode is used in combination with ion exchange, alum treatment, Fenton, electro-Fenton, photo-Fenton, $H_2O_2$, ozone, $Cl_2$, $ClO_2$, and anaerobic and aerobic biological oxidation.

In still another embodiment, said treatment enhances gas yield of anaerobic digestion.

In still another embodiment, effluent comprise industrial, domestic, chemical, paper industry, distilleries, textile and dyeing industries.

In still another embodiment, said treatment comprises controlling colour, COD, BOD and ammoniacal nitrogen, alone or in combinations thereof.

DESCRIPTION OF INVENTION

The invention will now be described in detail in connection with certain preferred and optional embodiments, so that various aspects thereof may be more fully understood and appreciated.

The present invention relates to vortex diode optionally with inserts/vortex stabilizers for effective effluent treatment.

In the present invention, cavitation is realized by rotational (vortical) flow rather than increasing linear velocity of liquid as in conventional devices. The number density as well as intensity of cavitation is significantly different than the conventional cavitation devices because of the radically different flow patterns and pressure history experienced by cavities generated in vortex diode.

The invention employs vortex-induced cavitation in the vortex diode optionally with inserts/stabilizers for generating radicals for expediting reactions and wastewater treatment. Further, Stabilization of the vortex diode and enhanced cavitation which has beneficial impact on reactions and waste water treatment is achieved by modifying the diode chamber design externally without dismantling the diode and using different flow rates.

The treatment of effluent involves controlling parameters selected from, but not limited to, appearance, colour, odour, pH, total dissolved solids, total suspended solids, ammoniacal nitrogen, chemical oxygen demand and biological oxygen demand to within limits prescribed by environmental control agencies.

Figure 1:
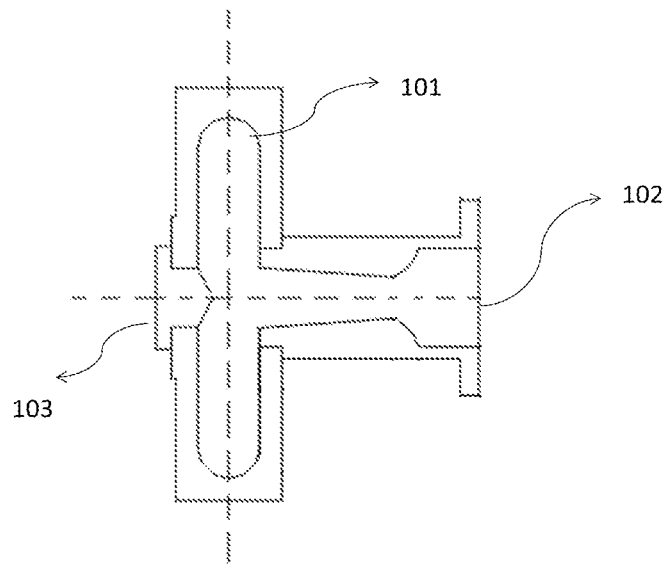
FIG. 1: Vortex diode with chamber (101), axial outlet port (102) and insert (103)
Figure 2:
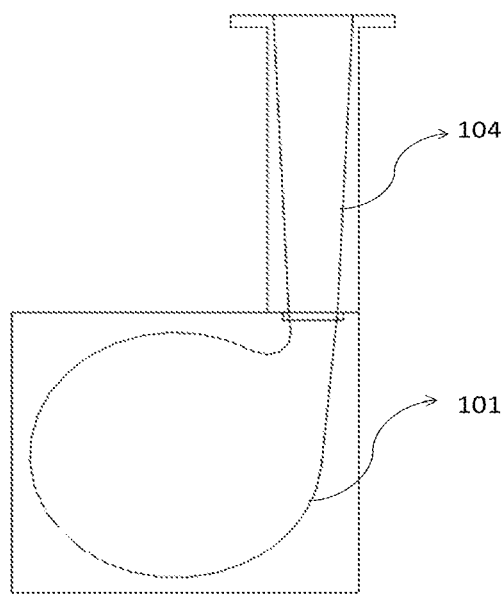
FIG. 2: Vortex diode with chamber (101) and tangential inlet port (104)

In an embodiment, the present invention provides a stable, cavitational vortex diode (Refer FIGS. 1 and 2), which comprises;

1. a single or multiple inlet as tangential port (104) attached to vortex diode cavitation chamber (101), wherein the flow entering from the tangential port sets up a strong vertical (rotational) flow within the chamber (101);
2. vortex stabilizer/insert (103) connected to a point on the axis of the chamber, 101 (vertex) which induces stronger and more stable vortex, wherein said vortex stabilizer/insert connection between the point and the perimeter of the base can be made of a surface achieved out of straight connecting lines having slope or curved lines having specific radius of curvature with the vertex as a common point; and
3. an axial port (102) for discharge.

In a preferred embodiment, vortex diode comprises an insert/vortex stabilizer placed in the chamber on the surface opposite to the axial port. The inserts/vortex stabilizer in the diode have specific shapes and the shape characteristics of the inserts are described herein.

The vortex diode of the invention may be of dimensions varying from few centimeters to meters. The vortex diode may also constructed from different materials of construction including metals, concrete and polymers.

The inserts comprise a flat circular (having diameter $d_b$) base connected to a point on the axis of the chamber (vertex). The distance ($d_v$) between the center of the base and the vertex is $d_v < h$, where h is the chamber height. The base diameter may be $d_B \leq d_C$, where $d_C$ is chamber diameter. The connection between the point and the perimeter of the base may be made of a surface achieved out of straight connecting lines having constant slope or curved lines having specific radius of curvature with the vertex as a common point. The connecting lines forming the surface can be straight as well as curved defining the nature of vortical flow in the chamber.

Figure 3:
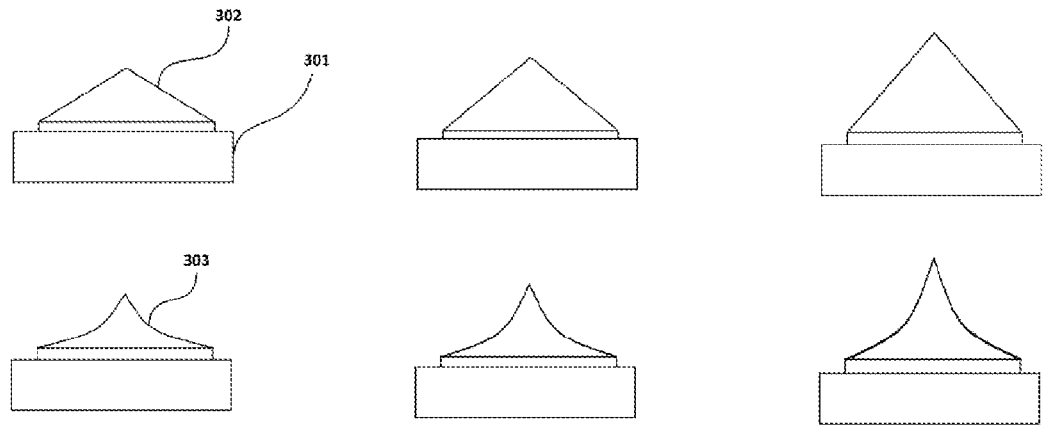
FIG. 3: Inserts for diode chamber (301: Insert base with or without threads, 302: conical insert with base 301, 303: hyperbolic conical insert with base as in 301)

The different insert shapes and sizes have significant effect on the stability and strength of vortex generated in the diode chamber. The presence of insert helps to increase the strength of vortex by minimizing the effect of asymmetry in the design and enhancing stability of generated vortex. Stable vortex leads to better conservation of energy leading to much higher reduction in pressure at the centre of the vortex. Insert with broader base although helps to increase the tangential velocity component by reducing flow area, its presence does not help avoid the effect of asymmetric design. The shape arising out of the curved lines connecting the base perimeter and the vertex yields better vortex stability than the normal conical insert shape. (FIG. 3)

Figure 4:
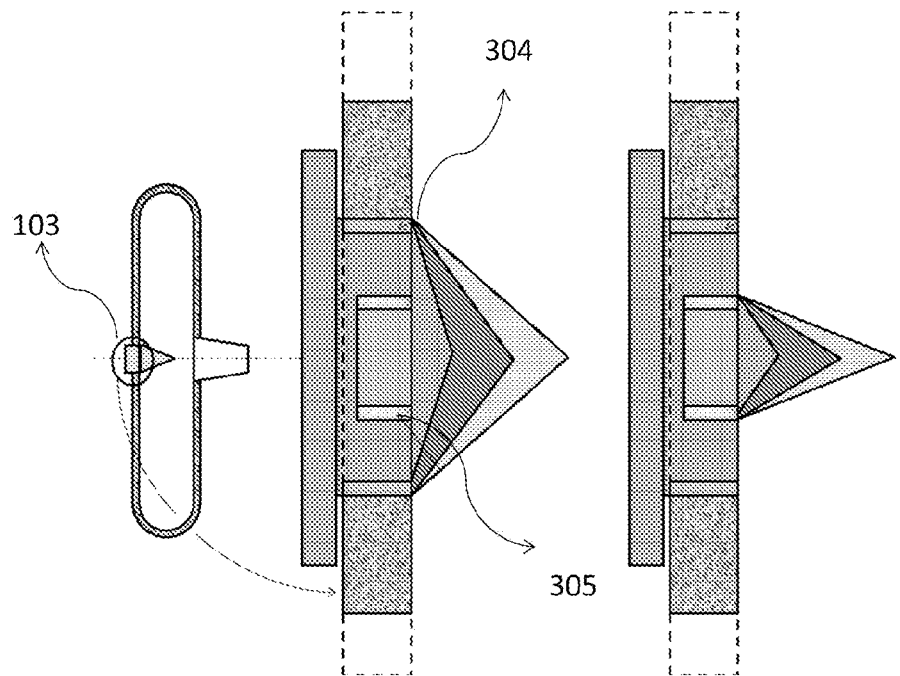
FIG. 4: Insert details. (304: threads or attachment for connecting the insert base to diode chamber, 305: threads or attachment for connecting the insert to insert base)
Figure 5:
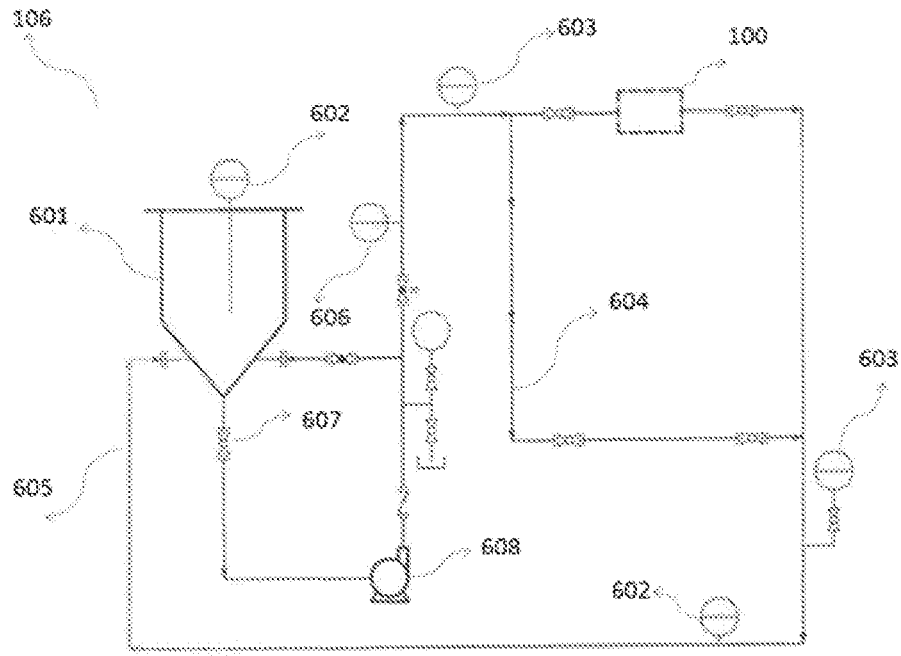
FIG. 5: Schematic of the flow loop. (100: vortex diode, 106: Flow loop, 601: holding tank, 602: temperature measurement port, 603: pressure gauge, 604: bypass line, 605: recycle line, 606: flow meter, 607: regulation valves, 608: pump FIG. 6: Colour reduction using Vortex diode FIG. 7: COD reduction in wastewater containing Congo Red Dye under different pressure drop conditions FIG. 8: Colour reduction using Disclosed Invention Device and wastewater containing Congo Red dye. under different pressure drop conditions FIG. 9: Colour reduction in wastewater containing Bismarck Brown dye.

The designs disclosed in the present invention are based on threaded section provided at the base plate of vortex diode as shown in (FIG. 4). The design disclosed allows inserts to be replaced without dismantling the diode. Appropriate insert can be selected depending upon the nature and magnitude of effluents (COD) to enhance the efficacy of the COD reduction. The inserts may also be welded, screwed in, push-fitted or attached to the body of the vortex diode by any other means.

In another embodiment, the present invention provides an apparatus consisting of vortex diode optionally with insert/vortex stabilizer for treating effluents, comprising;

1. a water intake means (104) through which effluent water enters from outside the chamber, 101;
2. a single or multiple inlet as tangential port (104) attached to vortex diode cavitation chamber, wherein the flow entering from the tangential port sets up a vortex establishing a pressure drop;
3. vortex stabilizer/insert (103) of diameter 10 to 40% of the chamber diameter and height in the range of less than 15% of chamber diameter connected to a point on the axis of the chamber (vertex), wherein connection between the point and the perimeter of the base can be made of a surface achieved out of straight connecting lines having slope or curved lines having specific radius of curvature with the vertex as a common point;
4. an axial port (102 to discharge treated effluent water and;
5. storage tank to store treated effluent water.

In yet another embodiment, the present invention provides a method of reducing COD, ammoniacal nitrogen and color of effluent in a vortex diode reactor optionally with inserts/stabilizer comprising pumping the effluent water at a flow rate of 100 to 50000 liter/hour, for about 120-180 min and collecting the treated effluent water being passed through the axial port in to the storage tank.

While the process is described in preferred embodiments, the process parameters vary with regard to dimensions of the diode reactor. The flow rates and time of residence may vary depending on rate of reaction. The inlet water may be recycled to achieve effluent parameters The vortex diode reduction in effluent parameters across wide range of pressure drops and other process parameters such as flow rates and temperature. Rather, the process parameters are standardized for scale of diode and type of effluent.

The reduction in COD is observed in the range of 75-90% and reduction in absorbance is the range of 10-15%.

The velocity of water and the pressure drop in an embodiment varies with the size and shape of the insert/vortex stabilizer.

The effluent water may be pretreated or the water collected after passing through the vortex diode can further be subjected to chemical or biological treatments known in the art.

The effluent is pumped into an inlet with 5 HP pump capable of pumping the effluent water through the loop with flow rate of up to 10000 liter/hour. The nominal pipe diameter of the loop is about 2 inch. The storage tank of 500 liter is used to store and treat the effluent water. The effluent with high COD value (depending on the type of pollutant) is treated in the disclosed cavitation device based on vortex diode with inser/vortex stabilizer. The loop is operated with the flow rate of approx. 4000 liter/hour for 120-180 min and the sample from the storage tank is tested for COD and color.

The invention comprises use of a standalone diode or multiple diodes in series. In an embodiment of the invention, the diodes are used in series. In another embodiment of the invention the diodes are used in parallel.

In an embodiment of the invention, the vortex diode with inserts is used for treatment of effluents for control of parameters selected from pH, colour, odour, COD and BOD. The process is easy to operate and control. The process can work effectively for a number of industrial wastewaters and with variety of pollutants. The level of treatment is such that not just reduction in COD to the extent of order of magnitude is accomplished, but the reclaimed water can also be recycled/reused with or without further treatment. The invention can also help in reduction of colour of the effluent. The invention effectively controls the reduction in COD and/or colour from the effluent waters with suitable adjustment of processing parameters and/or design modification in the reactor. Further, the vortex diode with or without the inserts/vortex stabilizer can effectively be used for treating effluents industrial, domestic, chemical, paper industry, distilleries, textile and dyeing industries and such like.

The vortex diode of the invention may be used alone or in combinations with effluent treatment processes selected from, but not limited to ion exchange, alum treatment, coagulant, Fenton, electro-Fenton, biological treatment, ozone based treatments, hydrogen peroxide based treatments, chlorine based treatments, chlorine dioxide based treatments etc. In a preferred embodiment of the invention, the process of effluent treatment is carried out with pressure drops ranging from 0.1-2 bar, though pressure drop may depend on the scale of operation.

The experimental loop for effluent treatment with the disclosed invention can be used with other conventional as well as modified separation processes such as adsorption. In the adsorption process, physico-chemical adsorption of organics can take place on the surface of adsorbent, thereby effecting removal of pollutants from the wastewaters. The disclosed invention can be used in combination with the adsorption process—either adsorption occurring prior to passing through the disclosed invention device or after the effluent is passed through the disclosed invention loop.

The extent of removal of COD would depend on the number of passes through the disclosed invention device while the number of passes through the adsorption column can be limited from once to multiple numbers. Further, a series of adsorption operation can also be employed for simultaneous reduction in the COD, ammoniacal nitrogen and removal of colour of the effluent. Apart from these, the process parameters such as pH of the solution, temperature also affect the performance. The temperature effect with the disclosed invention can be exploited to derive maximum benefit in combined adsorption-cavitation process using the disclosed invention.

The experimental loop for effluent treatment with the disclosed invention can be used with other conventional as well as modified separation processes such as Ion Exchange. In the Ion Exchange process, removal of organics-ionic in nature can take place on the surface of the resin-natural or synthetic (such as polymeric ion exchange resins), thereby effecting removal of pollutants from the wastewaters. the disclosed invention can be used in combination with the ion exchange process—either ion exchange occurring prior to passing through the disclosed invention device or after the effluent is passed through the disclosed invention loop. The extent of removal of COD would depend on the number of passes through the disclosed invention device while the number of passes through the ion exchange column can be limited from once to multiple numbers. Further, a series of ion exchange operation can also be employed for simultaneous reduction in the COD, ammoniacal nitrogen and removal of colour of the effluent. A combination of different types of resins such as anion and cation exchange resins, in general and weak base resins, in particular, can be very useful for increasing the effectiveness of the effluent treatment operation. For the wastewater treatment, it is quite attractive to employ weak base ion exchange resins which, although do not work in accordance with the conventional ion exchange mechanism, effect removal of both organics and acidic ionic species, thereby resulting in COD reduction to a great extent. Apart from these, the process parameters such as pH of the solution, temperature also affect the performance. The temperature effect observed with the disclosed invention can also be exploited to derive maximum benefit of a combined ion exchange-cavitation process using the disclosed invention. The experimental loop for effluent treatment with the disclosed invention can be used with other conventional as well as modified separation processes such as coagulation. Coagulation is a process in which destabilization of colloidal particles present in the solution is achieved by addition of salts, which reduce, neutralize or invert the electrical repulsion between particles. The addition of appropriate coagulant (organic or inorganic) can be effected in combination with the loop housing the disclosed invention device. The point of addition can be varied and can be before, after the cavitation device or it can be injected directly in the cavitation zone using appropriate methodology. The disclosed invention can be used in combination with the coagulation process—either coagulation occurring prior to passing through the disclosed invention device, in the cavitation zone or after the effluent is passed through the disclosed invention loop. The extent of removal of COD would depend on the number of passes through the disclosed invention device. Further, the two operations can be in a series for simultaneous reduction in the COD, ammoniacal nitrogen and removal of colour of the effluent. Apart from these, the process parameters such as pH of the solution, temperature also affect the performance. The temperature effect observed with the disclosed invention can also be exploited to derive maximum benefit of a combined coagulation-cavitation process using the disclosed invention.

The experimental loop for effluent treatment with the disclosed invention can be used with other reaction processes such as oxidation processes. Fenton and photo-Fenton oxidation processes have been generally reported in wastewater treatment. In the Fenton oxidation process, use of oxidation reagent such as hydrogen peroxide is employed with iron based catalyst. Use of other oxidizing reagents have also been reported in the published literature. In the disclosed invention device, there is generation of hydrogen peroxide and OH radical, which assist in the degradation of the pollutants in the effluent. In addition to this mechanism, a separate oxidation step combining different oxidizing agents along with the disclosed invention device can be employed in order to achieve maximum removal and therefore most efficient process performance for COD/ammoniacal nitrogen removal. To accomplish this, the disclosed invention can be used in combination with the oxidation process—either oxidation occurring prior to passing through the disclosed invention device, in the cavitation zone or after the effluent is passed through the disclosed invention loop. The extent of removal of COD would depend on the number of passes through the disclosed invention device. Further, a series operation can also be employed for simultaneous reduction in the COD, ammoniacal nitrogen and removal of colour of the effluent. Apart from these, the process parameters such as pH of the solution, temperature also affect the performance. The temperature effect observed with the disclosed invention can also be exploited to derive maximum benefit of a combined oxidation-cavitation process using the disclosed invention.

In an embodiment of the invention, the diode of the invention is used for altering the COD/BOD ratio. This offers advantages such as better gas yields and more effective reduction of other key parameters including BOD during further treatment by biological, microbiological or other means.

The process is further illustrated by the examples given herein below which should not however be construed to limit the scope of the invention.

EXAMPLES

Example 1

Experimental loop for effluent treatment with disclosed invention was established. The nominal pipe diameter of the loop was 2 inch. The set-up was equipped with 5 HP pump capable of pumping the effluent water through the loop with flow rate of up to 10000 liter/hour. The storage tank of 500 liter was used to store and treat the effluent water. Water with initial COD value of 1670 (mainly due to methyl red dye) was treated with the disclosed cavitation device based on vortex diode. The loop was operated with the flow rate of approx. 4000 liter/hour for 120-180 min and the sample from the storage tank was tested for COD. The COD level dropped to less than 150 within this 2 hrs of operation (thus an order of magnitude reduction was achieved).

Example 2

Figure 6:
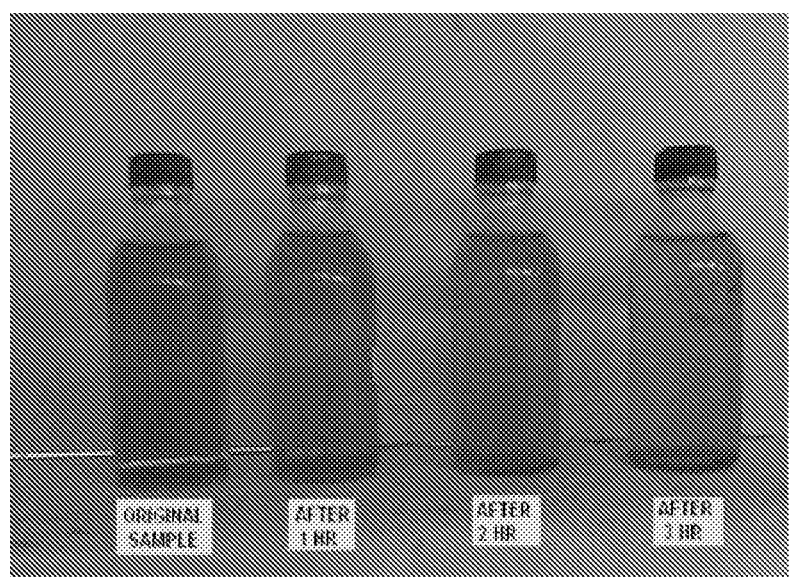

From the experimental set-up mentioned in Example (1), Water with initial colour absorbance value of 0.269 at 406 nm (mainly due to mixture of dyes/pigment) was treated with the disclosed cavitation device based on vortex diode. The loop was operated with the flow rate of approx. 4000 liter/hour for about 180 min and the sample from the storage tank was tested for colour reduction. The colour reduction to the extent of 10.7% was obtained within this 3 hrs of operation. The photograph of colour reduction is shown in FIG. 6 with, noticeable reduction in colour, which was achieved.

Example 3

Figure 7:
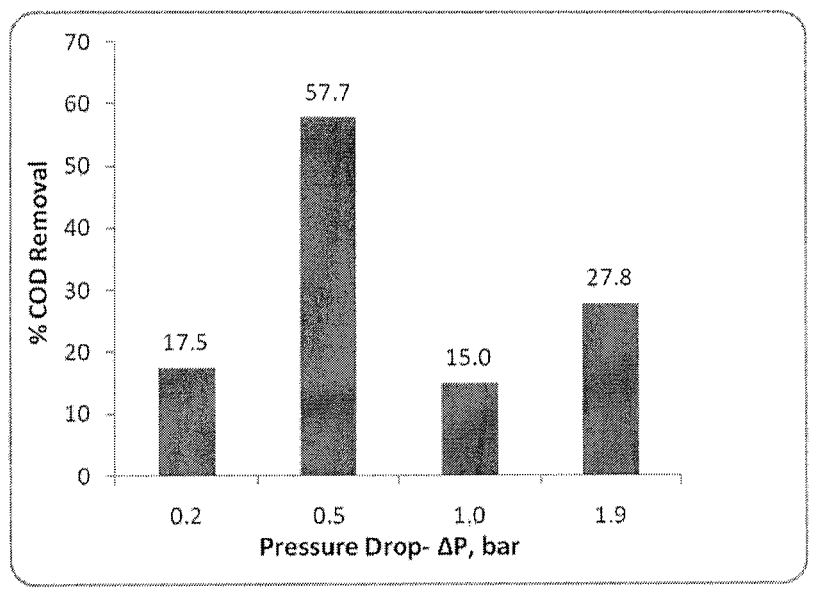

From the experimental set-up mentioned in Example (1), the nominal pipe diameter used was ¾". The set-up was equipped with pump capable of providing 1000 LPH flow through the section. A storage tank of 50 liters was used for the effluent storage. A synthetic wastewater solution containing Congo Red dye was used for the treatment. Using different conditions for the pressure drop through the disclosed invention device, a reduction of ~58% was obtained in the COD for initial COD of ~300 ppm. There is significant variation in the percentage COD reduction with the pressure drop obtained using the disclosed invention device. The results showing COD reduction are presented in FIG. 7. While at a pressure drop of 0.5 bar, it was observed that the % COD removed was over 57%, there was reduction in % COD ranging from 17% to almost 28% for pressure drops ranging from 0.2 to 2 bars (FIG. 7).

Example 4

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A synthetic wastewater solution containing Bismarck Brown dye was used for the treatment. Using different conditions for the pressure drop through the disclosed invention device, a reduction of ~72% was obtained in the COD for initial COD of ~300 ppm in about 3 h using pressure drop of ~0.5 bar. The results showing COD reduction are presented in Table 1.

TABLE 1

COD and colour reduction in wastewater containing Bismarck Brown dye.

| No | Time (min) | Absorbance | COD (ppm) | % COD Reduction | % Color Reduction |
|---|---|---|---|---|---|
| 1 | 0 | 0.195 | 316 | 71.51 | 60.51 |
| 2 | 20 | 0.186 | 300 | | |
| 3 | 40 | 0.157 | 244 | | |
| 4 | 60 | 0.137 | 206 | | |
| 5 | 90 | 0.112 | 158 | | |
| 6 | 120 | 0.101 | 136 | | |
| 7 | 150 | 0.078 | 92 | | |
| 8 | 180 | 0.077 | 90 | | |

Example 5

Figure 8:
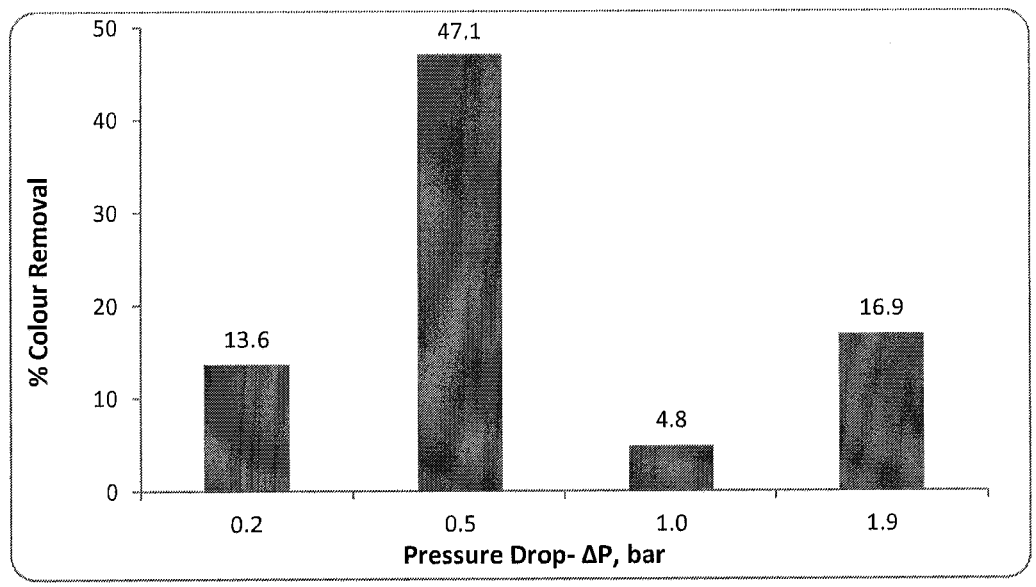

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A synthetic wastewater solution containing Congo Red dye was used for the treatment. Using different conditions for the pressure drop through the disclosed invention device, a reduction of ~58% was obtained in the COD for initial COD of ~300 ppm. There is significant variation in the percentage COD reduction with the pressure drop obtained using the disclosed invention device. Further, simultaneous to COD reduction, significant reduction in the color was also observed. The maximum reduction in the color was ~47% when the initial absorbance was 0.172. Here too, the reduction in the color was found to depend on the process variables, mainly the pressure drop obtaining using the disclosed invention device. The colour reduction is shown in FIG. 8.

Example 6

Figure 9:

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A synthetic wastewater solution containing Bismarck Brown dye was used for the treatment. Using different conditions for the pressure drop through the disclosed invention device, a reduction of ~72% was obtained in the COD for initial COD of ~300 ppm in about 3 h using pressure drop of ~0.5 bar, as outlined in Example 4. A simultaneous and significant reduction in the colour was also observed. The reduction in the colour was ~60% when the initial absorbance was 0.195. Here too, the reduction in the color was found to depend on the process variables, mainly the pressure drop obtaining using the disclosed invention device. The colour reduction is shown in FIG. 9.

Example 7

Figure 10:
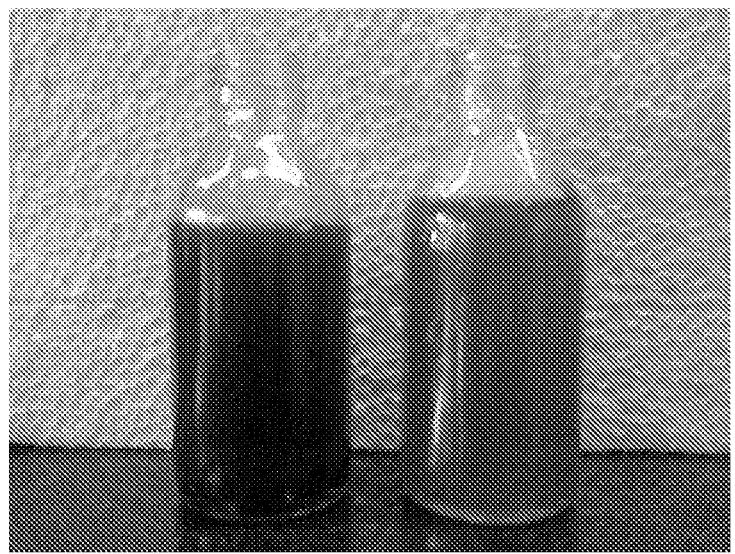
FIG. 10: COD Reduction vs Temperature of effluent (Brilliant Green Dye wastewater)
Figure 11:
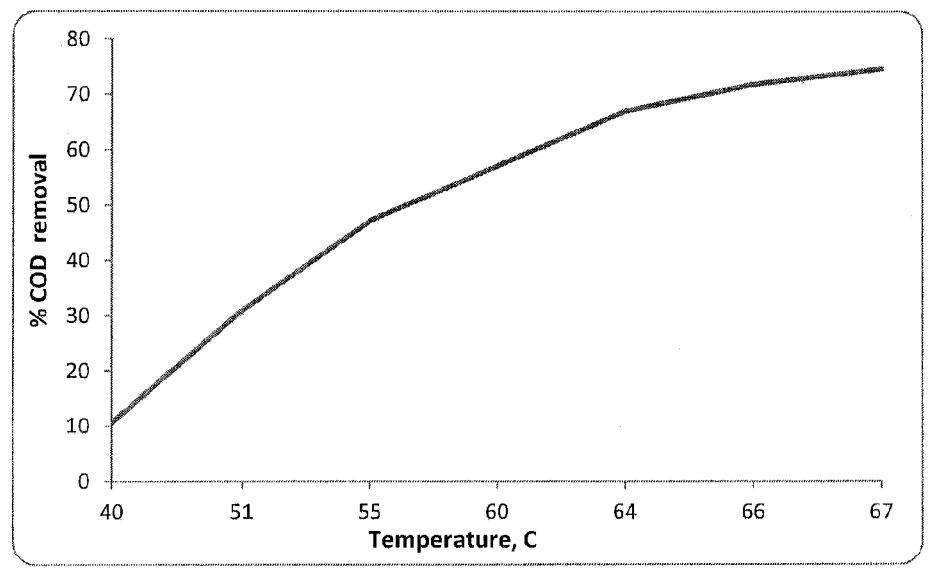
FIG. 11: % COD removal against temperature
Figure 12:
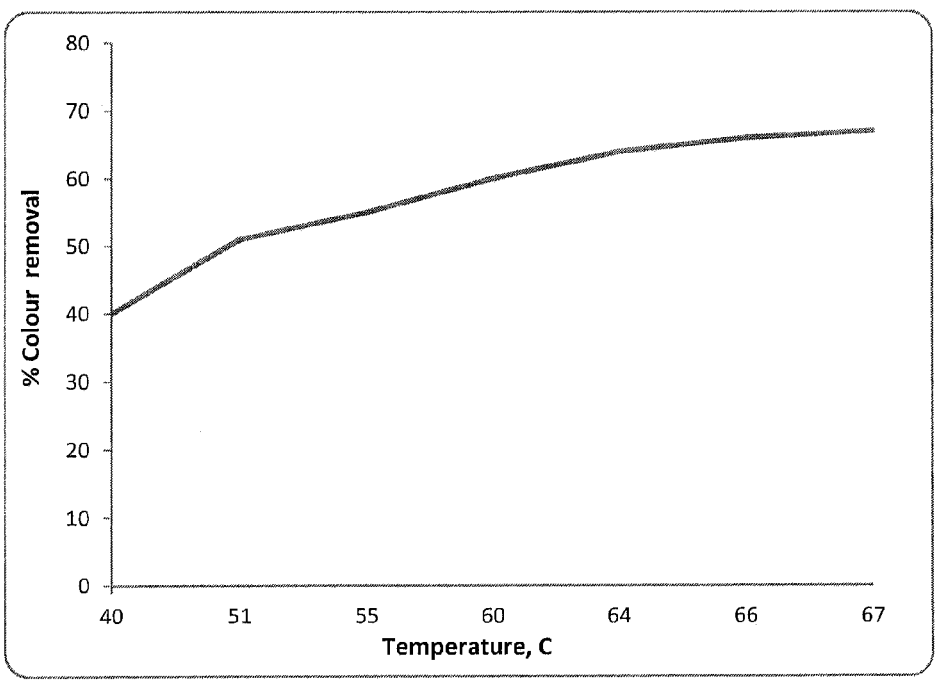
FIG. 12: Colour Reduction vs Temperature of effluent (Brilliant Green Dye wastewater)
Figure 13:
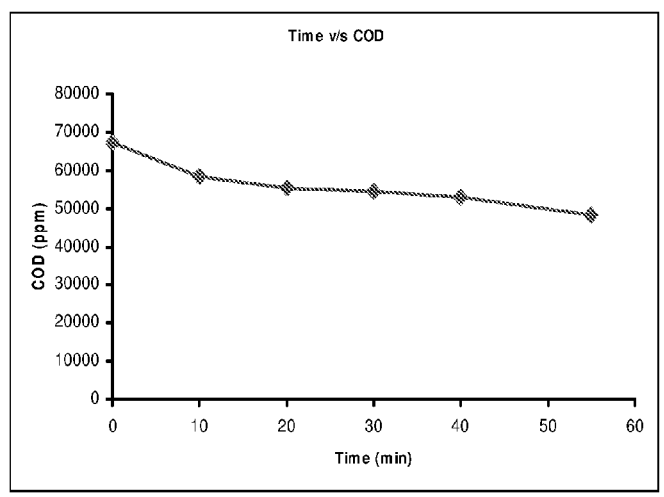
FIG. 13: Distillery wastewater treatment using Vortex Diode

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A volume of effluent ~25 liters was used for the experiment using a flow rate of 375 LPH. A synthetic wastewater solution containing Brilliant Green dye was used for the treatment. The pH of the effluent was 8.5. Using a temperature variation from initial temperature of 30 C to final temperature of 67 C, a reduction of ~75% was obtained in the COD for initial COD of ~284 ppm in about 3 h using pressure drop of ~0.5 bar. The temperature dependence of COD reduction is shown in FIG. 8. A simultaneous and significant reduction in the colour was also observed. The reduction in the colour was ~64% when the initial absorbance was 0.177. The colour reduction is seen to be dependent on temperature of the process and therefore can be manipulated using suitable temperature for the treatment of effluent stream. The colour reduction vs temperature of the effluent is shown in FIG. 10.

Example 8

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A volume of effluent ~25 liters was used for the experiment using a flow rate of 375 LPH. A synthetic wastewater solution containing Brilliant Green dye was used for the treatment. The experimental conditions were similar to that outlined in Example 7. The pH of the effluent was 8.5. A simultaneous reduction in Ammoniacal Nitrogen of the order of 38% was observed apart from reduction obtained in the COD in about 3 h using pressure drop of ~0.5 bar. Similarly, as given in the Example 6, simultaneous to reduction in the COD of the effluent solution, a reduction of ~41% was obtained in the Ammoniacal Nitrogen for synthetic effluent solution containing Bismarck Brown dye, under the conditions used in the Example 6. The present methodology is therefore capable of treating effluent streams for reduction in the COD, Colour and also in Ammoniacal nitrogen and can be applied to industrial effluents from different industry sectors.

Example 9

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A volume of effluent ~25 liters was used for the experiment using a flow rate of 375 LPH. A commercial industrial wastewater sample/effluent sample from dye manufacturing industry with initial COD value of 650 ppm, possibly containing mixture of dyes/pigment, was used for the treatment. The pH of the effluent was 7.4 and initial ammoniacal nitrogen content was 32.3 ppm. After one and half hour of operation using the disclosed invention device, a COD reduction of 14% was obtained. A simultaneous reduction in Ammoniacal Nitrogen of the order of 7% was observed apart from reduction obtained in the COD using pressure drop of ~0.5 bar. Thus, the effluent treatment process can be successfully applied to actual industrial wastewaters for simultaneous reduction in the COD of the effluent solution apart from reduction in the Ammoniacal Nitrogen.

Example 10

Cavitation coupled with coagulation of Auramine O (1600 mg/lit; Initial COD 2390 ppm) through a vortex diode of 60 mm diameter with flat chamber wall achieved 3.55% and 4.4% reduction in COD in 45 min when operated at 465 and 670 LPH with corresponding pressure drop conditions of 0.5 and 1 bar respectively at 450 C and with Alum (200 ppm).

Cavitation coupled coagulation of Auramine O (1600 mg/lit; Initial COD 2290 ppm) through a vortex diode of 60 mm diameter with flat chamber wall achieved 7% and 8% reduction in COD in 45 min when operated at 465 and 670 LPH with corresponding pressure drop conditions of 0.5 and 1 bar respectively at 47-580 C and with a mixture of alum (200 ppm) and Polyaluminum chloride (PAC) (100 ppm), respectively. The results are given in Table 2.

TABLE 2

Dye - AURAMINE O
Quantity of water: 25 lit.
Concentration: 1600 mg/lit
Alum: 200 ppm
Polyaluminum Chloride (PAC): 100 ppm
Device: Vortex Diode

| No | Time (min) | Temp (° C.) | Initial COD | Final COD | Absorbance | % COD Redn | Coagulants | Pr/flow |
|---|---|---|---|---|---|---|---|---|
| 1 | 45 | 47 | 2390 | 2305 | 0.530 | 3.55 | Alum | 0.5/465 |
| 2 | 45 | 56 | (0.549) | 2285 | 0.526 | 4.39 | Alum | 0.97/670 |
| 3 | 45 | 49 | 2290 | 2130 | 0.492 | 6.98 | PAC + alum | 0.5/465 |
| 4 | 45 | 58 | (0.526) | 2105 | 0.487 | 8.07 | PAC + alum | 1.0/670 |

Example 11

The disclosed invention was tested in a distillery spent wash treatment unit. Appropriately sized vortex diode based device was installed at a day tank storing the distillery spent wash for subsequent feeding to anaerobic digester. The distillery spent wash was circulated through the diode in a pipe loop (with nominal pipe diameter 2 inch) with a flow rate in the range of approximately 18 m3/hr. The diode was operated continuously for several hours. The treated spent wash was fed to the existing anaerobic digester which showed significantly higher (>13%) gas yield for the spent wash treated with the diode.

TABLE 3

| No | Time (min) | COD (ppm) | % Reduction |
|---|---|---|---|
| 1 | 0 | 67250 | — |
| 2 | 10 | 58350 | 13 |
| 3 | 20 | 55200 | 18 |
| 4 | 30 | 54350 | 19 |
| 5 | 40 | 52900 | 21 |
| 6 | 55 | 48450 | 28 |

TABLE 4

Enhancement in gas yield of anaerobic digester
after operating the vortex diode

| | Average gas yield, m3/hr | Minimum gas yield, m3/hr | Maximum gas yield, m3/hr |
|---|---|---|---|
| Before operating vortex diode | 731 | 650 | 810 |
| After operating vortex diode | 838 | 750 | 950 |

Example 12

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A volume of effluent ~25 liters was used for the experiment using a flow rate of 335 LPH and at pressure drop of 0.0.65 bar. A synthetic wastewater solution containing Bismarck Brown dye with initial COD of 314 ppm was used for the treatment. The Vortex Diode (vortex diode of 60 mm diameter with a 4 mm conical insert in the chamber) was used with internal as stated. The design of internal is as given in the FIG. 1 and FIG. 2. A reduction of ~20% in COD was observed using the internals within 2 hours. The data on the parameters used for the experiments and reduction in the COD values along with absorbance values are given in Table 5. A simultaneous reduction in the colour was also observed, as is evident from the reduction in the values of absorbance.

TABLE 5

Dye sample: BISMARCK BROWN
Quantity of wastewater: 25 lit.
Device: Vortex Diode with Internals.
Pressure drop = 0.65 bar
Flow rate = 330-340 LPH
Diode Internal-I
(vortex diode of 60 mm diameter with a 4 mm conical insert in the chamber)

| | | | | Cone ht. 4 mm | | |
|---|---|---|---|---|---|---|
| No | Time (min) | Temp (° C.) | Initial COD | Final COD | Absorbance | % COD Redn |
| 1 | 60 | 50 | 314 | 280 | 0.176 | 10.82 |
| 2 | 120 | 53 | (0.193) | 252 | 0.161 | 19.74 |

Example 13

Experimental loop for effluent treatment with disclosed invention was established. The nominal pipe diameter used was ¾". The set-up was equipped with pump capable of providing 1000 LPH flow through the section. A storage tank of 50 liters was used for the effluent storage. A volume of effluent ~25 liters was used for the experiment using a flow rate of 335 LPH and at pressure drop of 0.0.65 bar. A synthetic wastewater solution containing Bismarck Brown dye with initial COD of 410 ppm was used for the treatment. The Vortex Diode (vortex diode of 60 mm diameter with a 2 mm conical insert in the chamber) was used with internal as stated. The design of internal is as given in the FIG. 1 and FIG. 2. A reduction of ~20% in COD was observed using the internals within 2 hours. The data on the parameters used for the experiments and reduction in the COD values along with absorbance values are given in Table 6. A simultaneous reduction in the colour was also observed, as is evident from the reduction in the values of absorbance.

TABLE 6

Dye sample: BISMARCK BROWN
Quantity of wastewater: 25 lit.
Device: Vortex Diode with Internals.
Pressure drop = 0.65 bar
Flow rate = 330-340 LPH
Diode Internal- II
(vortex diode of 60 mm diameter with a 2 mm conical insert in the chamber)

| No | Time (min) | Temp (° C.) |
|---|---|---|
| 1' | 60 | 50 |
| 2 | 120 | 53 |

| | | Cone ht. 2 mm | |
|---|---|---|---|
| Initial COD | Final COD | Absorbance | % COD Redn |
| 410 | 386 | 0.230 | 5.85 |
| (0.243) | 324 | 0.198 | 20.97 |

ADVANTAGES OF THE PRESENT INVENTION

The present invention provides a device that can generate a strong vortex in the vortex chamber which significantly enhances rate of reactions and effectiveness of waste water treatment.

We claim:
1. A vortex diode for effluent treatment, wherein said vortex diode comprises:
   i. a chamber provided with a single or multiple inlet as a tangential port, wherein a flow entering from the tangential port sets up a high resistance mode of operation;
   ii. a vortex stabilizer connected to the chamber, wherein said vortex stabilizer comprises a base with or without threads and an insert which lies within the chamber; the insert being symmetrical around axis of an axial port and being formed by revolving either a straight connecting line having slope or a curved line between a point on the axis of symmetry of the chamber and a point lying on the base opposite to the axial port; and
   iii. the axial port being provided in the chamber for discharging treated effluent water;
   wherein the vortex stabilizer has a diameter in a range of 10 to 40% of a diameter of the chamber and a height less than 15% of the diameter of the chamber.
2. The vortex diode according to claim 1 wherein the vortex stabilizer is placed in the chamber from the surface opposite to the axial port.
3. An apparatus comprising consisting of a vortex diode with a vortex stabilizer for treating effluents, comprising;
   i. a chamber provided with a single or multiple inlet as a tangential port, wherein a flow entering from the tangential port sets up a high resistance mode of operation;
   ii. a vortex stabilizer connected to the chamber, wherein said vortex stabilizer comprises a base with or without threads and an insert which lies within the chamber; the insert being symmetrical around axis of an axial port and being formed by revolving either a straight connecting line having slope or a curved line between a point on the axis of symmetry of the chamber and a point lying on the base opposite to the axial port; and iii. the axial port provided in the chamber for discharging treated effluent water;

wherein the vortex stabilizer has a diameter in a range of 10 to 40% of a diameter of the chamber and a height less than 15% of the diameter of the chamber.

4. The apparatus according to claim 3, wherein the vortex stabilizer is placed in the chamber from the surface opposite to the axial port.

5. A method of treating effluent, said process comprising: providing an effluent as an input to an apparatus comprising a vortex diode, said vortex diode comprising:

i. a chamber provided with a single or multiple inlet as a tangential port, wherein a flow entering from the tangential port sets up a high resistance mode of operation;

ii. a vortex stabilizer connected to the chamber, wherein said vortex stabilizer comprises a base with or without threads and an insert which lies within the chamber; the insert being symmetrical around axis of an axial port and being formed by revolving either a straight connecting line having slope or a curved line between a point on the axis of symmetry of the chamber and a point lying on the base opposite to the axial port; and iii. the axial port provided in the chamber for discharging treated effluent water, wherein the vortex stabilizer has a diameter in a range of 10 to 40% of a diameter of the chamber and a height less than 15% of the diameter of the chamber.

6. The vortex diode according to claim 1, wherein said diode is used in combination with ion exchange, alum treatment, Fenton, electro-Fenton, photo-Fenton, $H_2O_2$, ozone, $Cl_2$, $ClO_2$, and anaerobic and aerobic biological oxidation.

7. The method according to claim 5, wherein said treatment enhances gas yield of anaerobic digestion.

8. The method according to claim 5, wherein the effluent comprises industrial waste, domestic waste, chemical waste, paper industry waste, distilleries waste, textile waste and dyeing industries waste.

9. The method according to claim 5, wherein said treatment comprises controlling color, Chemical Oxygen Demand (COD), Biological Oxygen Demand (BOD) and ammoniacal nitrogen, alone or in combinations thereof.

* * * * *